(12) United States Patent
Shao et al.

(10) Patent No.: US 7,588,866 B2
(45) Date of Patent: Sep. 15, 2009

(54) FILTER ARRAYS FOR LIQUID CRYSTAL DISPLAYS AND METHODS OF MAKING THE SAME

(75) Inventors: Jianxin Shao, Shanghai (CN); Bin Fan, Shanghai (CN)

(73) Assignee: Kinoptics Technologies Inc., Hong Kong (CN)

( * ) Notice: Subject to any disclaimer, the term of this patent is extended or adjusted under 35 U.S.C. 154(b) by 924 days.

(21) Appl. No.: 11/141,737

(22) Filed: Jun. 1, 2005

(65) Prior Publication Data

US 2006/0274230 A1 Dec. 7, 2006

(51) Int. Cl.
*G02F 1/1335* (2006.01)
*G03F 1/00* (2006.01)
(52) U.S. Cl. .................. 430/5; 430/7; 430/394
(58) Field of Classification Search ........... None
See application file for complete search history.

(56) References Cited

U.S. PATENT DOCUMENTS

| | | | |
|---|---|---|---|
| 4,876,164 A | 10/1989 | Watakabe et al. | |
| 5,008,166 A * | 4/1991 | Aoki | 430/7 |
| 6,383,694 B1 | 5/2002 | Wu et al. | |
| 6,809,784 B2 | 10/2004 | Hsu et al. | |
| 2004/0126679 A1 | 7/2004 | Yoo | |
| 2005/0174543 A1 | 8/2005 | Bin et al. | |
| 2005/0253792 A1 | 11/2005 | Shao et al. | |

FOREIGN PATENT DOCUMENTS

| | | |
|---|---|---|
| JP | 58-184146 | 10/1983 |
| JP | 63-15249 | 1/1988 |
| JP | 9-127702 A * | 5/1997 |
| JP | 200075277 | 3/2000 |
| KR | 2005032836 | 4/2005 |
| TW | 220536 B | 8/2004 |
| WO | 99/36811 | 7/1999 |

OTHER PUBLICATIONS

Computer-generated translation of JP 9-127702 (May 1997).*

* cited by examiner

*Primary Examiner*—John A. McPherson
(74) *Attorney, Agent, or Firm*—Fish & Richardson P.C.

(57) ABSTRACT

In general, in one aspect, the invention features methods that include forming a first lithography mask including a pattern corresponding to an array of filters for a liquid crystal display, using a lithography tool to project an image of the pattern onto multiple locations of a substrate to form an exposed substrate, and forming a second lithography mask from the exposed substrate.

20 Claims, 7 Drawing Sheets

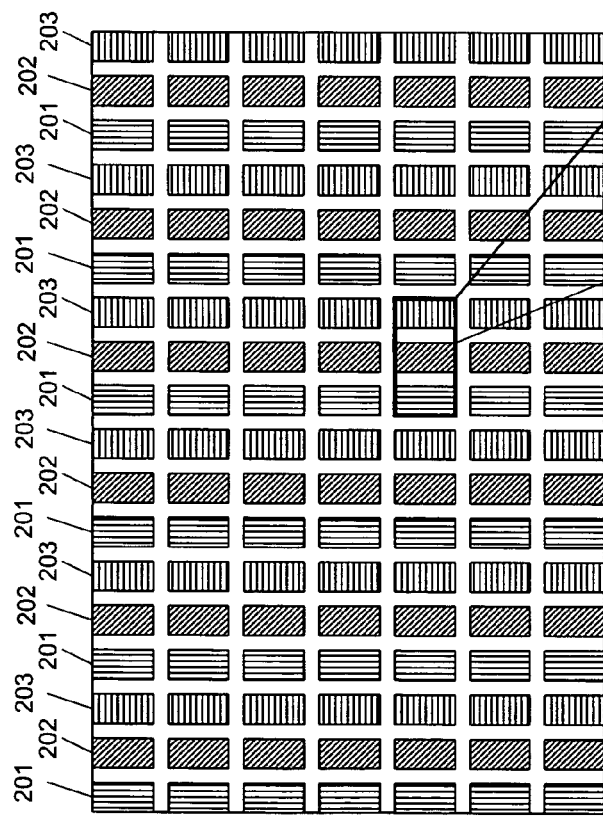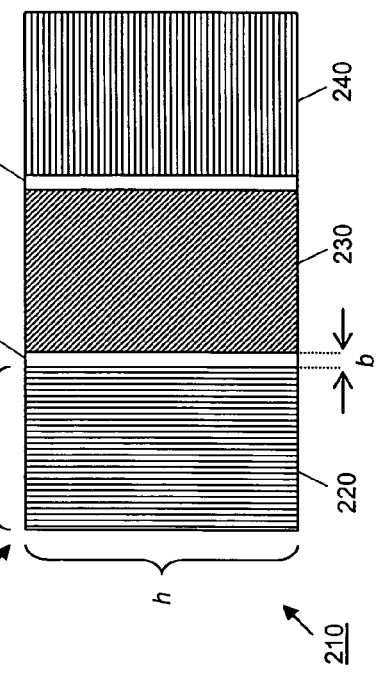

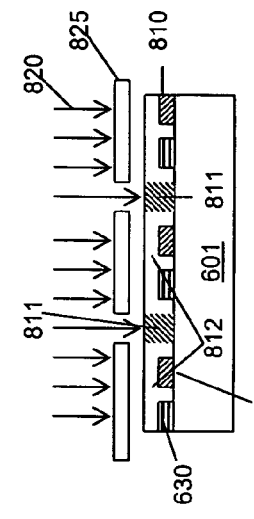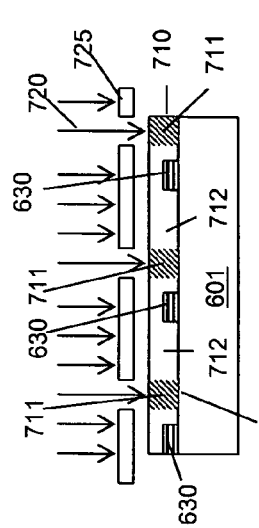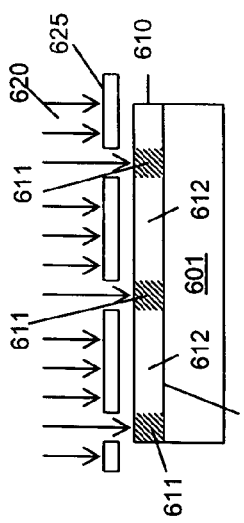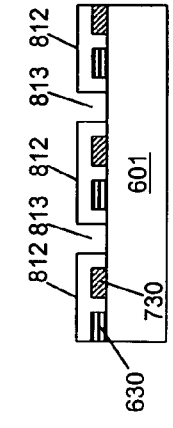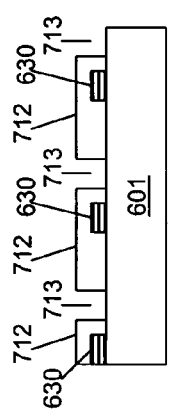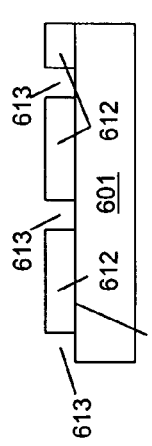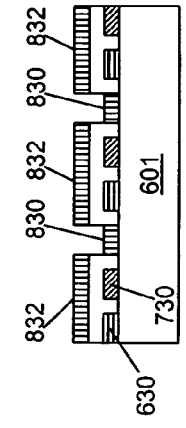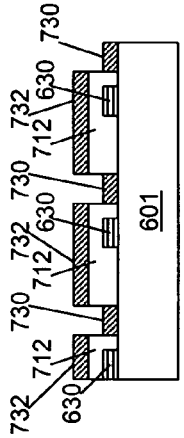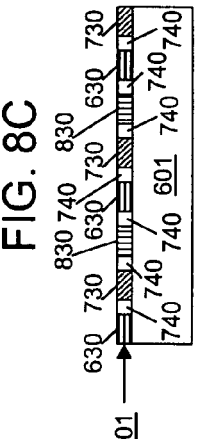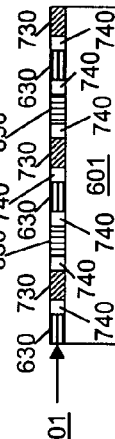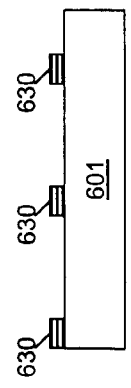

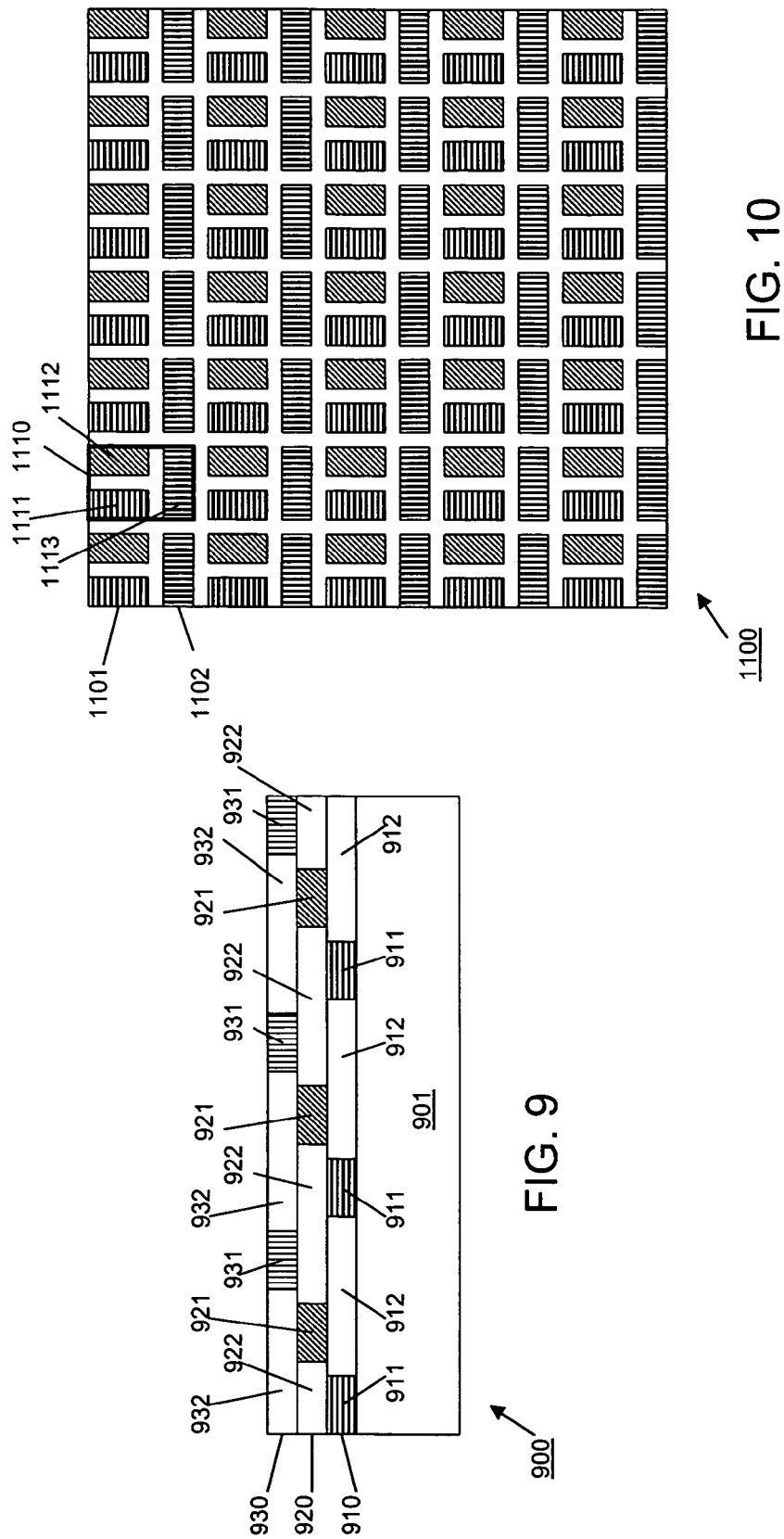

US 7,588,866 B2

FILTER ARRAYS FOR LIQUID CRYSTAL DISPLAYS AND METHODS OF MAKING THE SAME

TECHNICAL FIELD

This invention relates to filter arrays and methods for making filter arrays.

BACKGROUND

Examples of liquid crystal displays (LCDs) include direct view displays and projection displays (e.g., rear and front projection LCDs). Many LCD projection displays include a LCD microdisplay that modulates light from a light source to produce an image which is then projected onto a screen using an optical projection system. One type of LCD microdisplay is formed on a silicon substrate. Such LCD microdisplays are commonly referred to as Liquid Crystal on Silicon (LCoS) displays.

Many types of full color LCDs include arrays of color filters corresponding to the display's pixels. A display that produces color images by modulating the red, green, and blue content of each display pixel, for example, typically includes a red, green, and blue subpixel, where each subpixel has a color filter that selectively absorbs/transmits a portion of the visible spectrum. In many types of direct view displays, for example, a red subpixel includes a color filter that absorbs radiation in the blue and green portions of the visible spectrum, while transmitting radiation in the red portion of the visible spectrum. The red subpixel modulates the "red" content of the pixel by modulating the amount of light reflected or transmitted by the pixel, depending upon whether the display is a reflective or transmissive display. Similarly, the "green" and "blue" content of the pixel is controlled by modulating the amount of light reflected or transmitted by the green and blue subpixels, respectively.

Color filter arrays are generally used in displays that spatially synthesize color imagery. Alternatively, certain types of display sequentially modulate different colored light, where the human visual system fuses images of different color to provide the colored imagery. For example, projection displays using extremely fast light modulators (e.g., Digital Micromirror Devices) can be used in conjunction with a rotating color wheel (e.g., a rotating device that sequentially filters a light source providing light to the modulator) to provide a full color image. Other examples of full color projection displays overlap images from multiple display panels, each image being composed of a different color, to provide a full color image.

In general, for displays with spatially synthesized color, color filter arrays should include an element corresponding to each subpixel in the display. The shape of the filter elements should correspond to the shape of the pixel electrodes in the display. Furthermore, the filter array should be precisely aligned with the pixel electrodes. Accordingly, efficient and precise manufacturing and assembly techniques are desirable for producing color filter arrays and registering the arrays to the other portions of a display.

SUMMARY

In general, in one aspect, the invention features methods that include forming a first lithography mask including a pattern corresponding to an array of filters for a liquid crystal display, using a lithography tool to project an image of the pattern onto multiple locations of a substrate to form an exposed substrate, and forming a second lithography mask from the exposed substrate.

Implementations of the methods can include one or more of the following features. Forming the first lithography mask can include forming the pattern in a layer of a mask material on a mask substrate. For example, forming the first lithography mask can include scanning a beam across a surface of a resist layer disposed on the mask substrate prior to etching the layer of mask material. The beam can be an electron beam.

The methods can further include forming an array of filters for a liquid crystal display using the second lithography mask. The array of filters can be formed by exposing a layer of a photoresist on a filter wafer to patterned radiation formed using the second lithography mask. The patterned radiation can correspond to a pattern of filter arrays for a plurality of liquid crystal displays. The layer of photoresist can be exposed using proximity printing. Alternatively, or additionally, the layer of photoresist is exposed using optical contact printing. Forming the filter array can include exposing portions of a surface of the filter wafer by removing portions of the layer of photoresist material after the exposure. The removed portions can correspond to the patterned radiation. In some embodiments, forming the filter arrays includes deposited a multilayer structure over the exposed portions of the filter wafer surface and on residual portions of the layer of photoresist material. Forming the filter arrays can further include removing the residual portions of the layer of photoresist material after depositing the multilayer structure. The multilayer structure can include a plurality of layers of dielectric materials. Adjacent layers in the multilayer structure can have different refractive indexes. The multilayer structure can include an interference filter. The interference filter can substantially transmit a band of wavelengths in the visible portion of the electromagnetic spectrum. The band of wavelengths can correspond to red, green, or blue light.

The liquid crystal display can be a liquid crystal on silicon (LCoS) microdisplay. The method can include forming additional filter arrays on the filter wafer, wherein the additional arrays include interference filters that substantially transmit a band of wavelengths in the visible portion of the electromagnetic spectrum that is different from the band of wavelengths transmitted by the other filter arrays.

In general, in another aspect, the invention features methods that include simultaneously exposing a surface of a substrate to patterned radiation corresponding to multiple LCD filter arrays. Implementations of the method can include one or more features of other aspects of the invention.

In general, in a further aspect, the invention features methods that include forming a multilayer film on a surface of a substrate and removing portions of the multilayer film from the surface to provide elements of an liquid crystal display filter array on the substrate surface. Implementations of the method can include one or more features of other aspects of the invention.

In general, in yet a further aspect, the invention features methods that include forming a first plurality of multilayer filter arrays on a surface of a substrate, and forming a second plurality of multilayer filter arrays of a surface of a substrate, wherein the first and second plurality of filter arrays have different transmission characteristics and the first and second plurality of filter arrays correspond to subpixels in a liquid crystal display. Implementations of the method can include one or more features of other aspects of the invention.

Among other advantages, the invention can provide economical ways to fabricate interference filter arrays for LCD microdisplays, such as LCoS displays. Interference filter arrays can be fabricated using proximity printing or optical contact printing lithography techniques, which involve a one-to-one (non-imaging) transfer of the mask pattern to a photoresist layer on a substrate. These techniques can be used to form filter arrays for numerous displays on a single substrate relatively efficiently. For example, after initial alignment of the mask with the substrate, the entire substrate can be exposed in a single exposure step. Moreover, capital expenditure associated with setting up a facility for producing filters can be reduced since the equipment used for proximity printing and optical contact printing lithography is relatively inexpensive, especially when compared to lithography scanners, steppers, and step-and-scan systems.

The substrates on which filter arrays for multiple microdisplays are formed can be the same size as the wafers used to form the pixel electrode substrates (e.g., for LCoS microdisplays). For example, where pixel electrode substrates for individual microdisplays are formed on die sites on an 8 inch diameter silicon wafer, the filter arrays can be formed on corresponding sites on an 8 inch diameter substrate (e.g., glass substrate). Subsequently, the wafer and filter substrates can be bonded before being diced, thereby reducing (e.g., eliminating) the need to individually align the filter substrates to the pixel electrode substrates that would be required if displays were assembly individually.

Relatively large masks (e.g., 6 inch diameter masks, 8 inch diameter masks) for proximity printing or optical contact printing lithography can be relatively easily prepared. In some embodiments, large masks are prepared from a smaller mask using photolithography techniques. For example, a small mask can be prepared with a filter array pattern for relatively few filter arrays (e.g., about two or three filter arrays), a single filter array, or even just or a portion of a single filter array, using conventional mask-making techniques, such as direct writing lithography (e.g., electron beam lithography). The mask pattern can be reproduced with relatively high fidelity using a projection lithography tool (such as a stepper, scanner, or step-and-scan system). Since these tools are generally configured to handle 6 inch or 8 inch wafers, a mask the same size as a wafer can be formed relatively easily. Accordingly, these mask-making methods can provide additional benefits when the masks are used with proximity printing or optical contact printing techniques because they are the same size as commonly-used substrates.

The details of one or more embodiments of the invention are set forth in the accompanying drawings and the description below. Other features and advantages of the invention will be apparent from the description and drawings, and from the claims.

DESCRIPTION OF DRAWINGS

FIG. 2A is a plan view of a portion of a filter array for an LCD.

FIG. 2B is a plan view of a portion of the filter array shown in FIG. 2A corresponding to a single display pixel.

FIG. 6A-6D are schematic diagrams showing steps in the formation of filter elements on a filter wafer substrate.

FIG. 7A-7D are schematic diagrams showing additional steps in the formation of the filter elements on the filter wafer substrate shown in FIG. 6A-6D.

FIG. 8A-8D are schematic diagrams showing still further steps in the formation of the filter elements on the filter wafer substrate shown in FIG. 6A-6D.

FIG. 9 is a cross-sectional view of another embodiment of a filter array.

FIG. 10 is a plan view of a further embodiment of a filter array.

Like reference symbols in the various drawings indicate like elements.

DETAILED DESCRIPTION

Figure 1A:
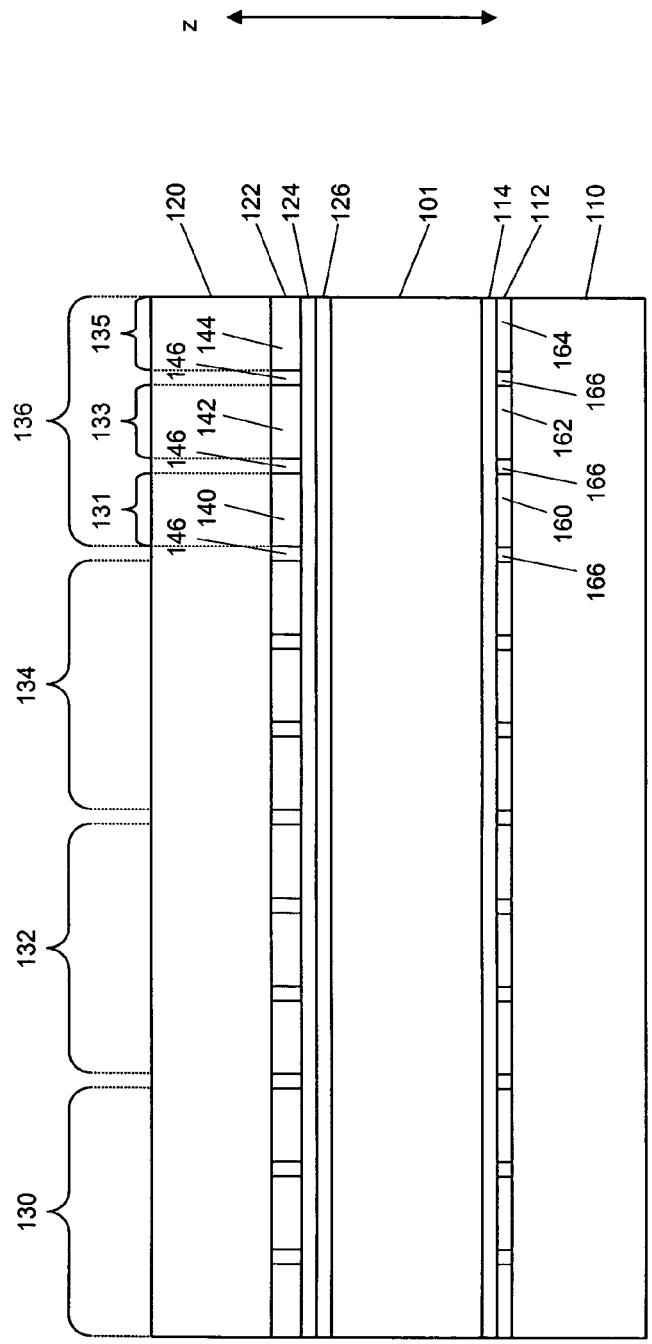
FIG. 1A is a cross sectional view of a portion of a full color liquid crystal on silicon (LCoS) microdisplay.

Referring to FIG. 1A, an LCoS microdisplay 100 includes a layer 101 of a liquid crystal (LC) material sandwiched between two substrates, substrate 110 and substrate 120. A pixel electrode layer 112 is formed on substrate 110, and an alignment layer 114 is disposed on a surface of the pixel electrode layer. Alignment layer 114 aligns LC molecules in layer 101 adjacent the alignment layer. Substrate 120 has a filter layer 122 disposed on one of its surfaces, and a common electrode layer 124 disposed on a surface of filter layer 122. An alignment layer 126 is disposed on a surface of common electrode layer 124.

Microdisplay 100 includes of an array of pixels, or picture elements, four of which are shown in FIG. 1A as pixels 130, 132, 134, and 136. In general, the number of pixels in the array can vary. In some embodiments, the array size corresponds to a graphics array standard. For example, the array can be a VGA array (640×480 pixels), an XGA array (1024× 768 pixels), an SXGA array (1280×1024 pixels), a UXGA (1600×1200 pixels), a WXGA array (1366×768 pixels), an HDTV array (1280×720 pixels), or an array having 1920× 1080 pixels.

Each pixel includes three subpixels corresponding to three complimentary colors (e.g., red, green, and blue, or cyan, magenta, and yellow). For example, pixel 136 includes subpixels 131, 133, and 135.

A voltage can be applied across each subpixel by energizing the subpixel's opposing electrodes. LC molecules respond to an applied voltage by reorienting in the electric field generated by the voltage. The reorientation results in changes in the birefringence properties of the subpixel for light incident on the display along the z-axis.

During operation of microdisplay 100, by varying the signal (e.g., voltage amplitude or pulse width) across the LC layer, each subpixel variably modulates the polarization state of incident light propagating along the z-axis having that subpixel's color. The subpixels reflect light of other colors without modulating that light's polarization. Accordingly, when a polarizer (e.g., a polarizing beam splitter) is positioned in the path of reflected light, the intensity of colored light reflected from each subpixel that is transmitted by the polarizer can be varied by modulating the component of that light polarized in the pass state of the polarizer.

Embodiments of LCoS displays that use reflective filter arrays are further described in International Application No. PCT/CN03/00348 filed on May 14, 2003, and corresponding U.S. patent application Ser. No. 10/506,264, entitled "A SILICON-BASED COLOR LIQUID CRYSTAL DISPLAY MICRODEVICE," filed on Aug. 31, 2004, the entire contents of which are hereby incorporated by reference.

Embodiments of projection displays that utilize displays such as display 100 are described in International Application No. PCT/CN2004/000110 filed on Feb. 10, 2004, and corresponding U.S. patent application Ser. No. 10/506,304, entitled "A COLOR PROJECTION DISPLAY SYSTEM," filed on Sep. 1, 2004, the entire contents of which are hereby incorporated by reference.

In general, the LC material in layer 101 is selected based on the optical mode of LCD 100, which corresponds to how the LC molecules are oriented in an energized and unenergized subpixel. Typically, the LC material is a nematic LC or a smectic LC (e.g., a ferroelectric LC) material.

Alignment layers 114 and 126 control the orientation of the LC material at the alignment layer surfaces. The alignment directions at layers 114 and 126 can be parallel, orthogonal, or at some intermediate angle. Alignment layers 114 and 126 can also induce a pretilt in the LC material at the alignment layer surfaces (e.g., from about 0 degrees to about 10 degrees). In some embodiments, the alignment layers vertically orient the LC material. In general, the alignment directions and pretilt are also selected based on the optical mode of LCD 100.

Alignment layers 114 and 126 can be formed from materials that can be encoded with an alignment direction. For example, in some embodiments, alignment layers 114 and 126 can be formed from polymeric materials (e.g., polyimides) that can be encoded with an alignment layer by physical buffing of the alignment layer surface. In certain embodiments, alignment layer materials can be encoded by exposure of the materials to polarized light (e.g., polarized UV light).

The separation between the alignment layers (and hence the thickness of LC layer 101) is controlled by spacers that are deposited onto the surface of alignment layer 114. In general, the thickness of LC layer 101 in the z-direction can vary, and also depends on the optical mode of microdisplay 100 and on the type of LC material used in the LCD. Typically, LC layer 101 has a thickness of about 0.5 µm to about 10 µm.

In an LCoS display, such as microdisplay 100, substrate 110 if formed from silicon. Pixel electrode layer 112 includes an array of subpixel electrodes that are formed on the silicon substrate. The subpixel electrodes for subpixel 131, 133, and 135, for example, are indicated by numerals 160, 162, and 164, respectively. Each subpixel electrode incorporates an electrical circuit allowing independent electrical addressing of each subpixel electrode. In some embodiments, each subpixel electrode include transistors in combination with one or more other component (e.g., a capacitor) integrated onto silicon substrate 110. Each subpixel electrode includes a layer of a reflective material that substantially reflects (e.g., wavelengths from about 380 nm to about 780 nm). For example, each subpixel electrode can include a layer of aluminum.

Substrate 120 is formed from a transparent material so that substrate 120 is substantially transparent in the visible portion of the spectrum (e.g., wavelengths from about 380 nm to about 780 nm).

Common electrode layer 124 is formed from a transparent electrically conductive material such as indium tin oxide. Filter layer 122 includes an array of interference filter elements that correspond to the subpixels. Filter elements for subpixels 131, 133, and 135 are indicated by numbers 140, 142, and 144, respectively. Each filter element in a pixel has a different transmission spectrum. Adjacent filter elements are separated by small light opaque region, referred to as the black matrix. For example, filter elements 140, 142, and 144 are separated by portions 146 of black matrix material.

Figure 1B:
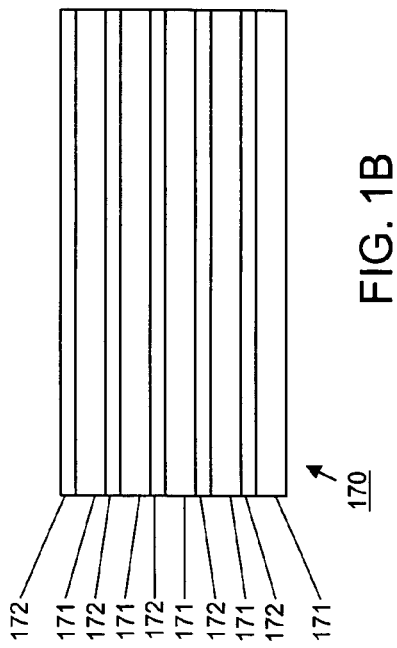
FIG. 1B is a cross-sectional view of a filter array element.

Referring to FIG. 1B, an example of an interference filter element is filter 170, which includes layers 171 of a material having a relatively low index of refraction alternating with layers 172 of a material having a relatively high index of refraction. The optical thickness of each layer 171 and 172 are selected so that the filter provides a desired transmission spectrum. For example, the optical thickness of layers in a green filter are selected so that the filter substantially transmits light having wavelengths in the green portion of the visible spectrum (e.g., from about 520 nm to about 580 nm), while substantially reflecting light having wavelengths outside the green portion of the visible spectrum. Similarly, the optical thickness of layers in a red and blue filter are selected so that the respective filters substantially transmit light having wavelengths in the red and blue portions of the visible spectrum.

In general, the materials used to form low and high index layers 171 and 172 are selected based on their refractive indexes in the visible spectrum and on their compatibility with the methods used to manufacture the interference filters. Typically, low and high index layers are formed from dielectric materials, such as oxide materials (e.g., metal oxide materials).

The composition of each of low index layers 171 can be the same or different. Similarly, the composition of each of high index layers 172 can be the same or different. Materials that can be used to form the low index layers include cryolite (n≈1.35), cerium fluoride (n~1.63), $SiO_2$ (n~1.46), LiF (n~1.37), $ThF_4$ (n~1.52), $Al_2O_3$ (n~1.63), and magnesium fluoride (n~1.38). Materials than can be used to form the high index layers include zirconium dioxide (n~2.1), titanium dioxide (n~2.40), $HfO_2$ (n~1.98), $CeO_2$ (n~2.20), $Nb_2O_5$ (n~2.20), $Ta_2O_5$ (n~2.10), $Si_3N_4$ (n~2.0), and zinc sulphide (n~2.32). The refractive index values quoted correspond to the materials refractive index in the visible portion of the electromagnetic spectrum.

Since each filter element in a subpixel has a different transmission spectrum, the layer profile for each subpixel filter element is different. In general, the number of layers in each subpixel filter element can be the same or different. Moreover, the materials used to form the high and/or low index layers in each subpixel filter element can be the same or different.

While filter element 170 includes 10 layers, in general, the number of layers in a filter element can vary. Generally, the number of layers is selected based on the desired reflection/transmission profile of the filter. For example, embodiments where large bands of wavelengths are to be reflected can include more layers than embodiments where the reflected wavelength bands are smaller. Furthermore, embodiments that have extremely high reflectivity at a reflected band of wavelengths (e.g., about 98% or more, about 99% or more) can include more layers than embodiments where the desired reflectivity for the same band of wavelengths is not as high (e.g., about 90% or less). In some embodiments, filter elements can include about 15 or more layers (e.g., about 20 or more layers, about 30 or more layers, about 40 or more layers, about 50 or more layers).

Referring to FIG. 2A, the filter elements forming filter layer 122 are arranged as a tiled, which includes alternating red, green, and blue columns of subpixel filter elements, shown as columns 201, 202, and 203. Each pixel includes an adjacent red, green, and blue subpixel filter element. Filter elements for one pixel are indicated by area 210 in FIG. 2A. Referring also to FIG. 2B, pixel filter 210 includes red subpixel filter element 220, green subpixel filter element 230, and blue subpixel filter element 240. Adjacent subpixel filter elements are separated by a portion 250 of black matrix material which has a width b. The black matrix portions mask the portions of the LCD between adjacent subpixels.

In pixel filter 210, each filter element has the same dimensions, having a pitch, p, and a height, h. p refers to the maximum dimension of the filter element in the horizontal viewing direction while h refers to the maximum dimension of the filter element in the vertical viewing direction. In general, p and h vary depending on the size and resolution of the display. In certain embodiments, p is about 2 μm or more (e.g., about 3 μm or more, about 5 μm or more, about 10 μm or more, about 15 μm or more, about 20 μm or more). Typically, in filter arrays used in LCD microdisplays, p is about 150 μm or less (e.g., about 100 μm or less, about 80 μm or less, about 50 μm or less). Additionally, h is about 3 μm or more (e.g., about 5 μm or more, about 8 μm or more, about 10 μm or more, about 20 μm or more, about 40 μm or more). Typically, h is about 300 μm or less (e.g., about 200 μm or less, about 100 μm or less, about 80 μm or less).

Each pixel filter has a pitch, π, corresponding to the pitch of the display's pixels (in the horizontal direction). Pitch π also varies depending on the display's size and resolution. In some embodiments, π is about 5 μm or more (e.g., about 10 μm or more, about 20 μm or more, about 30 μm or more, about 40 μm or more, about 50 μm or more). Typically, in filter arrays used in LCD microdisplays, π is about 500 μm or less (e.g., about 300 μm or less, about 200 μm or less, about 100 μm or less).

In filter array 200, due to the layout of the array, the subpixel height corresponds to the pixel height.

In general, interference filter arrays, such as filter array 200, can be prepared using a variety of methods, including lithography methods. For example, in some embodiments, a wafer of filter arrays can be produced using a lithography stepper or a lithography scanner, which records an array pattern from a mask into a photoresist at multiple sites on a wafer substrate. Each site corresponds to a filter array for a single LCoS display. The exposed photoresist is processed to expose portions of the substrate onto which layers of the filter elements can deposited. In this way, elements for multiple filter arrays can be formed together on a single wafer, which can then be bonded to a substrate wafer that includes a corresponding number of display substrates. The bonded structure can be diced to provide individual display units.

In certain embodiments, a lithography stepper or scanner can be used to prepare a larger lithography mask, rather than the filter array wafer itself. The larger mask pattern can then be transferred to a resist layer on a wafer by optical contact printing or proximity printing. Subsequent deposition and etching steps can be used to form a filter array wafer that can be bonded to a substrate wafer. In optical contact printing, the mask is contacts the resist layer during exposure. In proximity printing, the mask is positioned close to (but not contacting) the resist layer during exposure. In both techniques, there is a one-to-one transfer of the mask pattern to the resist—there is no projection system that magnifies or demagnifies a mask image onto the resist. Moreover, in proximity printing and optical contact printing, an entire wafer is typically exposed in a single exposure step, compared to using a stepper or scanner which conventionally serially exposes wafer sites while moving the mask and wafer relative to each other. Accordingly, wafer exposure using proximity printing or optical contact printing can be accomplished relatively quickly.

Using optical contact printing and/or proximity printing can also be advantageous because the equipment used is typically substantially less expensive than a lithography stepper or scanner. Accordingly, optical contact printing and/or proximity printing can provide a substantial economic advantage to a manufacturer of the filter arrays and/or the manufacturer of displays that include interference filter arrays.

Various aspects of lithography and lithography systems are described in detail by J. R. Sheats and B. W. Smith in "Microlithography, Science and Technology," published by Marcel Dekker, Inc. (New York, N.Y.) (1998).

Various aspects of filter array production methods are set forth in more detail below.

Figure 3:
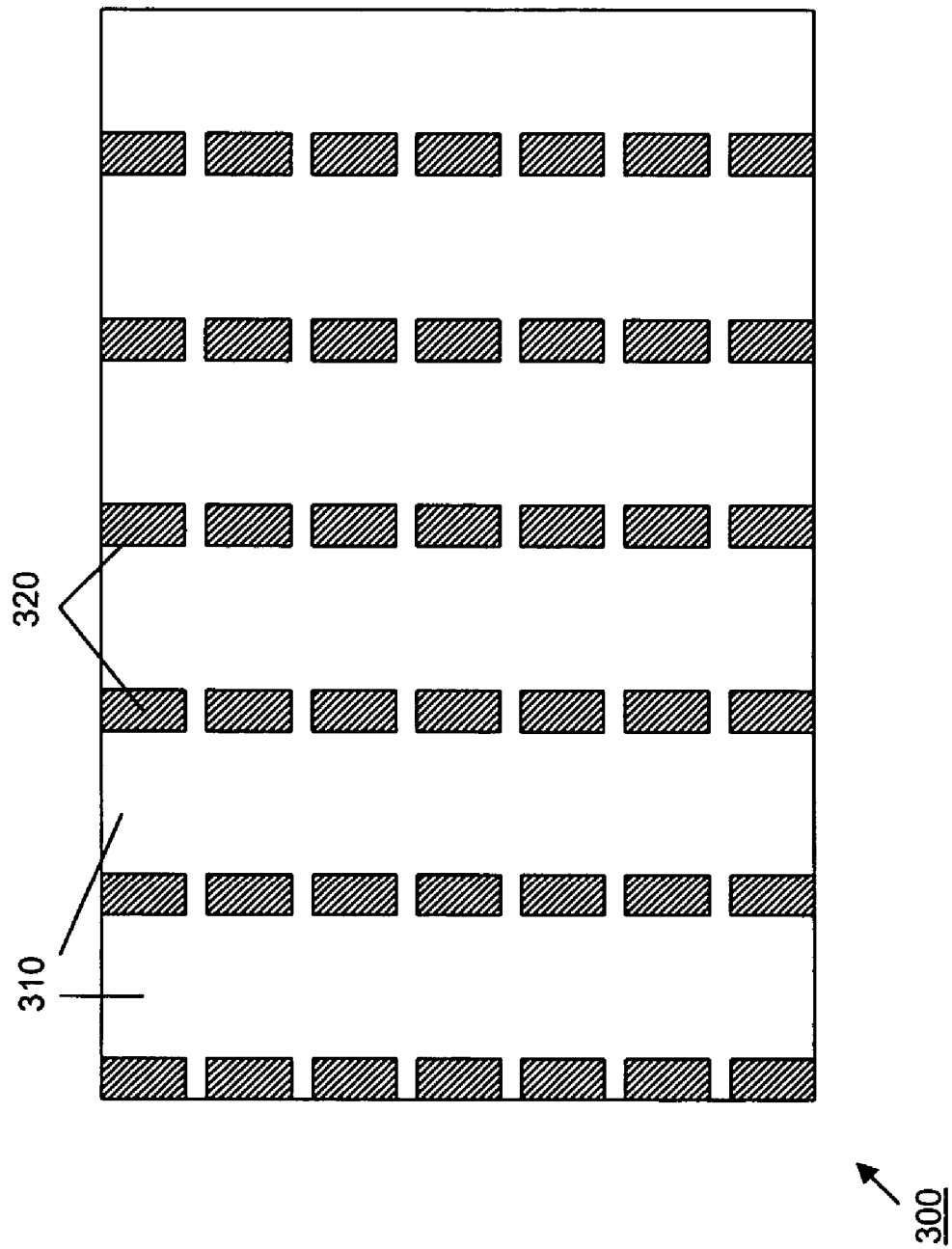
FIG. 3 is a plan view of a primary mask.

Referring now to FIG. 3, in certain embodiments, a primary filter mask 300 is used to prepare a production filter mask, from which filter arrays are then produced. Primary filter mask 300 includes an array of filter portions 320 corresponding to subpixel filter elements. The filter portions can either block or transmit radiation used to expose the photoresist, depending on whether the primary filter mask is to be used with lift-off or subtractive techniques and whether those techniques will use a positive or negative resist.

Conventionally, masks are formed by depositing and patterning one or more materials that substantially absorb and/or reflect exposing radiation on a substrate that substantially transmits exposing radiation. For example, when the exposing radiation is UV radiation (e.g., less than about 350 nm, less than about 300 nm, less than about 250 nm, less than about 200 nm), the mask can include metallic (e.g., chrome) blocking portions formed on a glass (e.g., quartz glass) or crystalline (e.g., fluoride crystal, such as crystalline calcium fluoride, crystalline barium fluoride, or crystalline strontium fluoride) substrate.

In some embodiments, the pattern of filter portions 320 on primary filter mask 300 corresponds to the pattern of subpixel filter elements of a single color in a display. Alternatively, in certain embodiments, primary filter mask 300 includes filter portions corresponding to only a fraction of the filter elements of a single color in the display and multiple adjacent portions of a substrate are exposed to the primary filter mask during the production of a single display's filter array. In other embodiments, primary filter mask 300 includes filter portions 320 that correspond to subpixel filter elements for several displays (e.g., two or more, three or more, four or more).

Primary filter mask 300 can be produced using direct-writing lithographic methods, such as electron beam lithography, for example.

Figure 4:
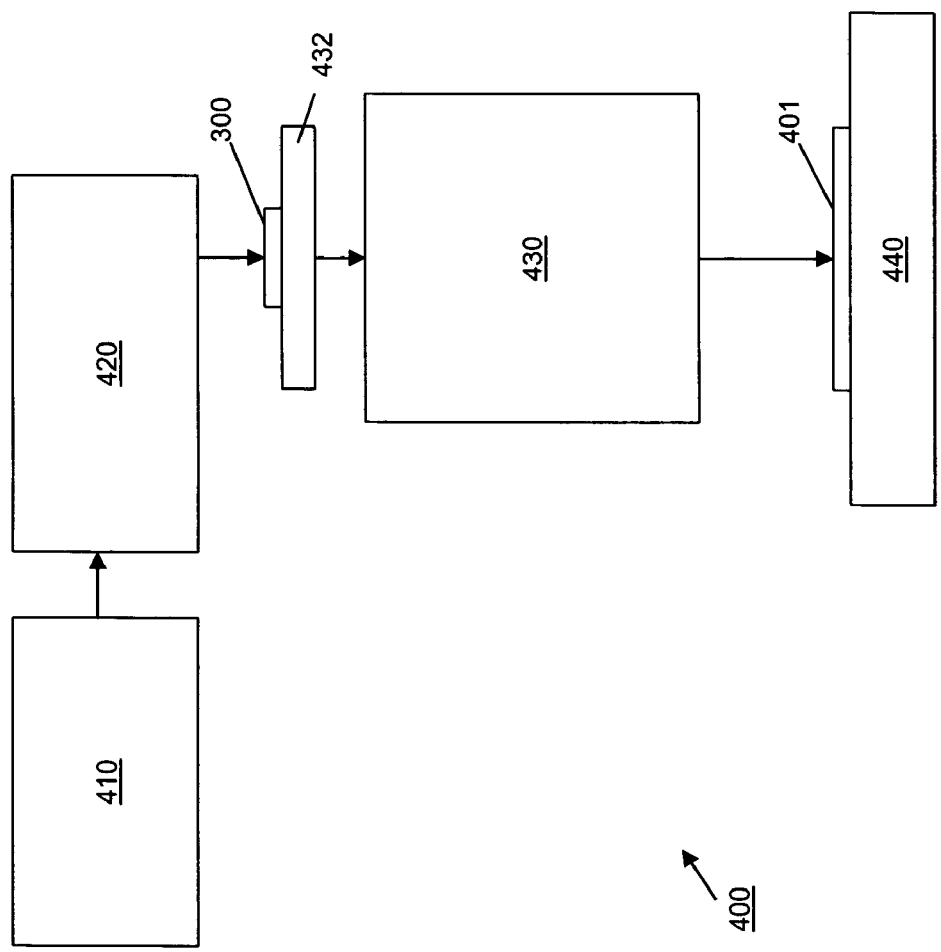
FIG. 4 is a schematic diagram of an embodiment of a lithography tool.

Referring to FIG. 4, a lithography tool 400 is used to transfer the filter array pattern on primary mask 300 to a layer of a photoresist on a mask wafer 401, which forms the basis of a production filter mask. Mask wafer 401 can be the same size as a conventional silicon wafer (e.g., an 8 inch diameter wafer or a 6 inch diameter wafer).

Mask wafer 401 can include alignment features that allow a vision system (e.g., alignment scope) in the lithography tool to locate and position the mask wafer. For example, in some embodiments, the mask wafer can include a layer of silicon (e.g., a complete layer covering an entire surface on one side of the mask wafer, or a discontinuous layer covering only portions of a surface), providing portions that are optically compatible with a vision system used to locate silicon wafers. Other materials having similar optical properties (e.g., a similar refractive index at the wavelength(s) relevant to the vision system) to silicon can also be used.

Lithography tool 400 includes a light source 410 (e.g., a UV light source, such as a UV laser) and an illumination system 420 that directs light from light source 410 to illuminate primary filter mask 300 positioned on a reticle stage 432. A projection system images mask 300 onto a surface of mask wafer 401 that is positioned relative to the projection system on a stage 440.

In some embodiments, lithography tool 400 is a scanner, in which the mask and mask wafer are simultaneously scanned through a field of projection system 430. Conventionally, the field is a narrow arc of an extremely large circular field. The narrow arc corresponds to a radius for which aberrations are substantially compensated and spans the diameter of the mask wafer so that the entire wafer is exposed in a single pass.

Alternatively, lithography tool 400 can be a stepper in which projection system 430 has a field that is just large enough to expose about one or two sites on mask wafer 401 at a time. Fields are sequentially exposed with stage 440 repositioning mask wafer 401 with respect to the field between exposures.

In certain embodiments, lithography tool 400 is a step-and-scan system which serially scans an image of mask 300 across portions of mask wafer 401, stepping the wafer mask relative to projection system 430 between each scan.

Lithography scanners and lithography steppers are described, for example, in Sheats and Smith, supra, and are available commercially from Nikon Precision Inc. (Belmont, Calif.), Canon USA, Inc. (San Jose, Calif.), and ASML US, Inc. (Tempe, Ariz.).

In general, the image of the mask at the mask wafer can be the same size as the mask or can be magnified or demagnified. Conventionally, in scanners the image is a 1× projection of the mask, while in steppers and step-and-scan systems the image is demagnified relative to the mask. For example, steppers and step-and-scan projection systems can demagnify the mask about 2× or more (e.g., about 3× or more, about 4× or more, about 5× or more, about 8× or more, about 10× or more).

After mask wafer 410 has been exposed, the photoresist is developed leaving only portions of the resist layer and exposing the underlying surface in other portions. If a positive photoresist was used, the portions of resist exposed to radiation remain after developing. Conversely, if a negative resist is used, portions that were not exposed to radiation remain after developing.

In a subtractive technique, mask wafer 410 includes a layer of a mask material. Development of the exposed photoresist exposes portions of this layer's surface. Subsequent etching (e.g., wet etching or plasma etching) of mask wafer 410 removes exposed portions of the mask material layer. The mask wafer is etched sufficiently long to expose the wafer substrate.

Alternatively, in a lift-off process, the mask wafer surface exposed by developing is a surface of the mask wafer substrate. A layer of a mask material is subsequently deposited on the residual photoresist and exposed portions of the mask wafer substrate.

In embodiments using either technique, the residual resist is stripped from the wafer. In embodiments where subtractive etching of the mask material is used, stripping simply exposes the remaining mask material, which are the blocking portions of the production filter mask. In embodiments using the lift-off technique, stripping removes both the residual resist portions, and the mask material that was deposited onto the residual resist portions.

In general, stripping can be performed by rinsing the wafer in a solvent that dissolves the remaining resist. Examples of positive photoresist strippers include acetone, trichloroethylene, and phenol-based strippers. Examples of negative photoresist strippers include methyl ethyl ketone and methyl isobutyl ketone. Alternatively, the wafer can be baked to remove the residual resist by calcination.

In some embodiments, the lithography tool used to expose the mask wafer can be used to expose silicon wafers used to form corresponding substrates for LCoS displays. By using the same tool for both the mask wafer and the silicon wafer, the effects of systematic alignment errors in the tool can be reduced since the same errors will manifest in both the filter array and the silicon substrate wafer, thereby offsetting each other.

Figure 5:
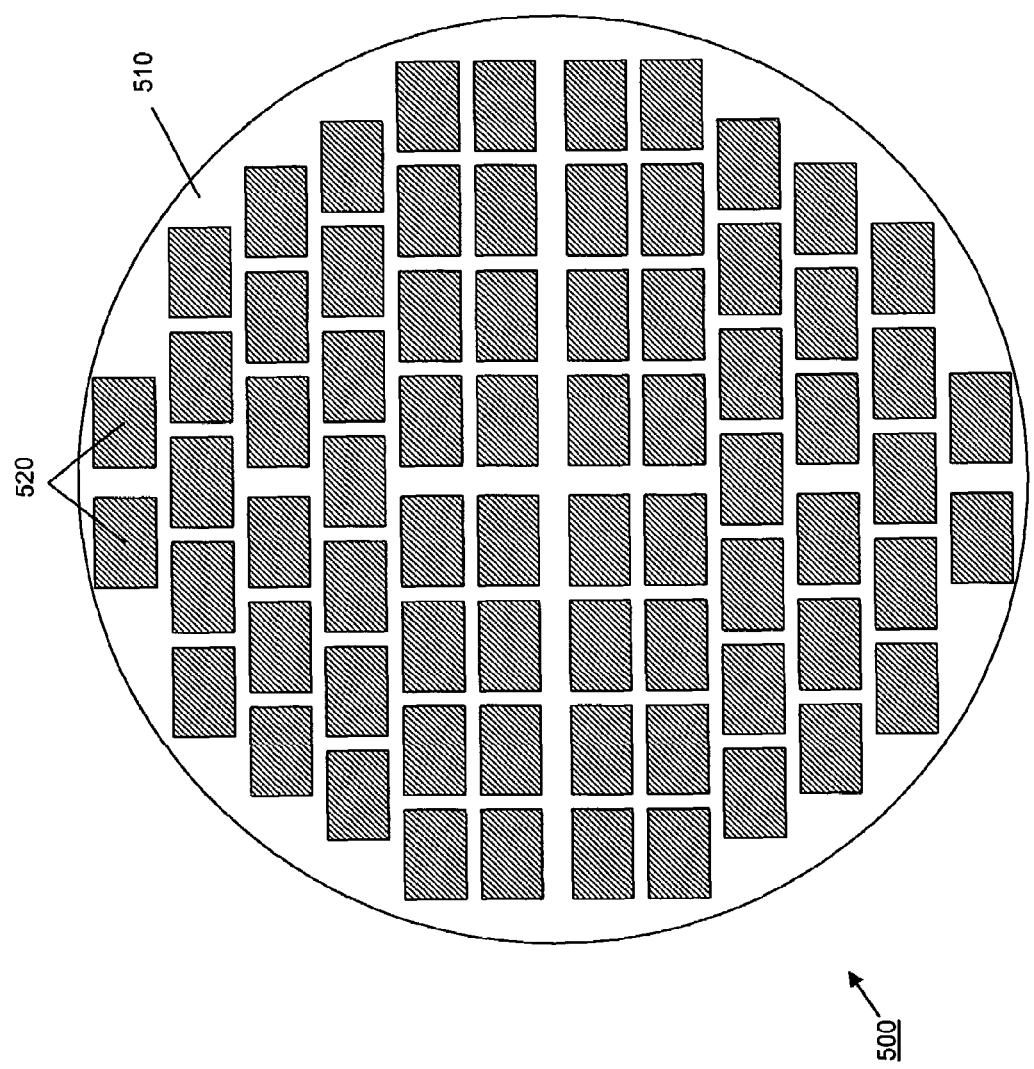
FIG. 5 is a schematic diagram of an embodiment of a production array mask.

Referring to FIG. 5, a production filter mask 500 includes filter array patterns located at each die site 520. Although production filter mask 500 includes 72 die sites, in general, the number of die sites on a production mask can vary. Generally, the total number of die sites depends on the size of each filter array and the size of the mask wafer on which the production filter mask is formed. In some embodiments, a production filter mask can include about 20 to about 150 die sites per wafer.

Reduction lithography (e.g., where the image of the mask is demagnified) can be used to resolve extremely small features in the mask's image, enabling the formation of extremely small features on the production filter mask. Furthermore, relatively large production filter masks can be produced using these techniques. For example, mask wafers can be the same size as conventional silicon wafers used to produce integrated circuits (e.g., 6 inch or 8 inch diameter wafers). Moreover, the mask pattern can be reproduced with high fidelity at every site on the wafer mask.

Referring to FIGS. 6A-6D, 7A-7D, and 8A-8D, in some embodiments, filter arrays formed on a filter wafer using a production filter mask in a proximity printing process. In this example, a negative photoresist is used in a lift-off process to fabricate the filter arrays.

Referring specifically to FIG. 6A, a layer of a photosensitive resist 610 on a surface 602 of a filter wafer substrate 601 is exposed to radiation 620 through a production filter mask 625 positioned close to the surface of the resist. Mask 625 includes portions that transmit radiation 620 exposing portions 611 of resist layer 610. Residual portions 612 of the resist are masked by the blocking portions of mask 625.

Referring to FIG. 6B, the exposed resist layer is developed, which removes the exposed portions of the resist, exposing surface 602 of substrate 601 at regions 613. Next, layers of dielectric material are sequentially deposited onto the exposed surface of the resist and the exposed portions of surface 602. The deposited layers for filter array elements 630 at regions 613 and similar multilayer structures 632 on top of residual resist portions 612 as shown in FIG. 6C.

In general, the high and low index material layers that form the filter array elements can be deposited using a variety of methods. For example, in some embodiments, physical deposition methods, such as sputtering (e.g., plasma sputtering) or evaporation (e.g., thermal or electron beam evaporation) can be used to deposit the high and low index layers. Alternatively, or additionally, chemical deposition techniques can be used (e.g., chemical vapor deposition).

Once filter array elements 630 are formed, residual resist portions 612 are stripped by rinsing in an appropriate stripper or by calcination of the resist material by baking. This lift-off process also removes multilayer structures 632 from substrate 601, leaving only filter array elements 630 on the substrate surface as shown in FIG. 6D.

Referring to FIG. 7A, a new layer of photoresist 710 is then deposited onto surface 602 and filter array elements 630. Photoresist layer 710 is exposed to radiation 720 through a production filter mask 725 positioned relative to substrate 601 so that portions 711 of resist nearby filter elements 630 are exposed to the radiation while the rest of the resist layer (i.e., portions 712) is shaded.

The exposed resist layer is developed, removing exposed resist at regions 713 (see FIG. 7B). Filter array elements 730 are then formed by depositing a multilayer structure onto surface 602 at exposed portions 713 (see FIG. 7C). Residual resist portions 712 and residual multilayer structures 732 are removed, leaving behind filter array elements 630 and 730 on substrate 601 (see FIG. 7D).

The sequence of steps used to form filter array elements 630 and 730 are repeated to provide the third group of filter array elements. Referring to FIG. 8A, a layer 810 of photoresist material is disposed over filter array elements 630, 730 and exposed regions of surface 602 and exposed to radiation 820 through a production filter mask 825. Mask 825 exposes portions 811 between filter array elements 630 and 730. The exposed resist layer is then developed, removing portions 811 to expose surface 602 at regions 813, while leaving resist portions 812 covering filter array elements 630 and 730 (see FIG. 8B).

Referring to FIG. 8C, filter array elements 830 are formed at regions 813 by depositing a multilayer film onto the exposed portions of surface 620. This deposition also forms multilayer structures 832 on residual portions 812 of the resist layer. Resist portions 812 and multilayer structures 832 are subsequently removed.

A layer of black matrix material is disposed on substrate 601, filling in the spaces between filter array elements 630, 730, and 830, before or after the deposition of the filter array elements 630, 730, and 830, providing filter layer 801.

In embodiments where filter array elements 630, 730, and 830 have the same shape and are arranged in the same pattern, a single mask can be used for masks 625, 725, and 825. Of course, where filter array elements 630, 730, and 830 each have a different shape or are arranged in different patterns, masks 625, 725, and 825 are different.

While certain steps are described in reference to FIGS. 6A-8D above, in general, the methods outlined above for forming filter arrays on a filter wafer can include additional steps. In some embodiments, one or more baking steps can be used. For example, when photoresist material is disposed on the wafer using a solvent, the photoresist layer can be baked to remove residual solvent from the layer prior to the next process step. In some embodiments, baking steps can also be used to cure layers of photoresist material, for example.

In general, one or more additional layers can be deposited on top of filter layer 801. For example, a layer of a material that can subsequently be planarized can be disposed on top of filter layer 801. In embodiments where filter layer 801 is to be positioned between substrate 601 and the liquid crystal material in an LCD, a layer of an alignment material (e.g., a polyimide) can be deposited on top of filter layer 801.

Moreover, while layers 610, 710, and 810 are formed from negative photoresists, in general, either positive or negative photoresist materials can be used. Generally, photoresist layers can be single or multilayer resists.

Furthermore, while the foregoing methods described in reference to FIGS. 6A-8D utilize proximity printing to transfer the mask pattern to the photoresist, in some embodiments, optical contact printing can be used.

In embodiments where a filter wafer includes filter arrays for multiple displays, the filter wafer can be bonded to a substrate wafer including a corresponding number of display substrates prior to dicing the filter wafer into individual display filter arrays. Alternatively, in certain embodiments, the filter wafer can be diced prior to bonding, and display filter arrays can be bonded to display substrates on an individual basis.

While the filter array elements in the filter array described above in regard to FIGS. 6A-8D form a single layer, layer 801, other arrangements are also possible. For example, in some embodiments, different filter array elements can be formed in different layers. An example of a filter array that includes different filters formed on different layers is filter array 900, which is shown in FIG. 9. Filter array 900 includes three layers of array elements supported by a substrate 901. A first layer 910 includes filter elements 911 that are formed on a surface of substrate 901. A transparent material is deposited in the regions between adjacent filter elements 911, and the surface of the transparent material and the surface filter elements 911 are co-planar so that a second layer 920 of filter elements can be formed on layer 910. Layer 920 includes filter elements 921 that are separated by a transparent material in regions 922. A third layer 930 of filter array elements is formed on top of layer 920. Layer 930 includes filter elements 931 that are separated by regions 932 of transparent material.

Although the subpixel filter elements in array 200 are arranged in columns, in general, other array geometries can also be used. An example of another array geometry is shown in FIG. 10. In this example, a filter array 1100 includes subpixel filters arranged in rows 1102 of a single color and rows 1101 of two alternating colors. Each pixel filter includes two subpixel filter elements along one of rows 1101, and a subpixel filter element in the adjacent row 1102. For example, a pixel filter 1110 includes a first color subpixel filter element 1111 and a second color subpixel filter element 1112 in top row 1101, and a third color subpixel filter element 1113 in adjacent row 1102.

Furthermore, while rectangular filter elements have been described, in general, other filter element shapes are also possible. Typically, the shape of filter elements are selected so that the filter elements can be easily tiled, both within a pixel, and on a pixel-by-pixel basis. Examples of filter element shapes include polygons, such as triangles, squares, rectangles, hexagons, and octagons. In some embodiments, filter elements can be curved in shape (e.g., including arcuate edges, such as circular or elliptical edges).

Moreover, in general, the area of each subpixel filter element in a pixel can be the same as the area of the other subpixel filter elements or can be different.

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising:
   forming a first lithography mask comprising a pattern corresponding to an array of filters for a liquid crystal display;
   using a lithography tool to project an image of the pattern onto multiple locations of a substrate to form an exposed substrate; and
   forming a second lithography mask from the exposed substrate.

2. The method of claim 1 wherein forming the first lithography mask comprises forming the pattern in a layer of a mask material on a mask substrate.

3. The method of claim 2 wherein forming the first lithography mask comprises scanning a beam across a surface of a resist layer disposed on the mask substrate prior to etching the layer of mask material.

4. The method of claim 3 wherein the beam is an electron beam.

5. The method of claim 1 further comprising forming an array of filters for a liquid crystal display using the second lithography mask.

6. The method of claim 5 wherein the array of filters is formed by exposing a layer of a photoresist on a filter wafer to patterned radiation formed using the second lithography mask.

7. The method of claim 6 wherein the patterned radiation corresponds to a pattern of filter arrays for a plurality of liquid crystal displays.

8. The method of claim 6 wherein the layer of photoresist is exposed using proximity printing.

9. The method of claim 6 wherein the layer of photoresist is exposed using optical contact printing.

10. The method of claim 5 wherein forming the filter array comprises exposing portions of a surface of the filter wafer by removing portions of the layer of photoresist material after the exposure.

11. The method of claim 10 wherein the removed portions correspond to the patterned radiation.

12. The method of claim 10 wherein forming the filter arrays comprises deposited a multilayer structure over the exposed portions of the filter wafer surface and on residual portions of the layer of photoresist material.

13. The method of claim 12 wherein forming the filter arrays further comprises removing the residual portions of the layer of photoresist material after depositing the multilayer structure.

14. The method of claim 12 wherein the multilayer structure comprises a plurality of layers of dielectric materials.

15. The method of claim 12 wherein adjacent layers in the multilayer structure have different refractive indexes.

16. The method of claim 12 wherein the multilayer structure comprises an interference filter.

17. The method of claim 16 wherein the interference filter substantially transmits a band of wavelengths in the visible portion of the electromagnetic spectrum.

18. The method of claim 17 wherein the band of wavelengths corresponds to red, green, or blue light.

19. The method of claim 5 wherein the liquid crystal display is a liquid crystal on silicon (LCoS) microdisplay.

20. The method of claim 19 further comprising forming additional filter arrays on the filter wafer, wherein the additional arrays comprise interference filters that substantially transmits a band of wavelengths in the visible portion of the electromagnetic spectrum that is different from the band of wavelengths transmitted by the other filter arrays.

* * * * *

UNITED STATES PATENT AND TRADEMARK OFFICE
CERTIFICATE OF CORRECTION

| | |
|---|---|
| PATENT NO. | : 7,588,866 B2 |
| APPLICATION NO. | : 11/141737 |
| DATED | : September 15, 2009 |
| INVENTOR(S) | : Jianxin Shao and Bin Fan |

It is certified that error appears in the above-identified patent and that said Letters Patent is hereby corrected as shown below:

Column 13, line 19 in claim 12, delete "deposited" and insert --depositing--.

Signed and Sealed this

Tenth Day of November, 2009

David J. Kappos
*Director of the United States Patent and Trademark Office*